United States Patent Office 3,511,701
Patented May 12, 1970

3,511,701
WELDING ELECTRODE WITH A BASIC COATING
René-Jacques Mouton, Le Perchoir Montvert,
Aix-en-Provence, France
No Drawing. Filed Mar. 22, 1967, Ser. No. 624,984
Claims priority, application France, Apr. 1, 1966,
56,089
Int. Cl. B23k 9/24, 35/00
U.S. Cl. 117—206
9 Claims

ABSTRACT OF THE DISCLOSURE

This invention relates to a welding electrode with a basic coating consisting, on the one hand, essentially of alkali metal or alkaline earth metal carbonates and fluorides to which its basic character is due, and, on the other hand, of boric anhydride ($B_2O_3$) in the free or combined form. According to the invention, the coating contains at least 0.5% of boric anhydride and at least 1% of iron carbonate and/or manganese carbonate, these two carbonates being replaceable at least partially by at least one of the higher iron and manganese oxides.

---

The present invention relates to a welding electrode with a basic coating consisting, on one hand, essentially of alkali metal or alkaline earth metal carbonates and of fluorides to which its basic character is due and, on the other hand, of boric anhydride ($B_2O_3$) in free or combined form.

It is known that in electrodes with a coating designated as "basic coating," the proportion of alkali metal and/or alkaline earth metal carbonate and alkali metal and/or alkaline earth metal fluoride is generally higher than 40% of the total weight of all the components of the coating, with the exception of metal powders which are frequently contained in this coating and which are intended to influence the composition of the deposited weld metal. The coating of these electrodes has furthermore a low content of components which are able to release hydrogen in the course of welding.

These basic electrodes permit one to deposit steel having a low hydrogen content and they are very convenient for the welding of tempered steel sheets, in particular for the welding of steel sheets with high resistance.

They have the drawback of depositing a porous metal at the instant of striking the arc, particularly when the first welding pass is deposited on the bottom of a seam with converging surfaces. The porosity can be particularly important when vertical welding is effected in the upward direction because this welding compels one to extend the arc for passing the electrode horizontally over the whole surface of the welding bath.

These electrodes with a basic coating have the further drawback of causing an irregular distribution of the flux on the welding pool in the case of welding a horizontal seam in a chamfer between horizontal sheets or in the angle between a horizontal sheet and a vertical sheet. In the case of welding chamfered horizontal sheets, the flux tends to accumulate on the surfaces of the chamfer, whilst in the case of welding a horizontal sheet to a vertical sheet the flux tends to accumulate on the horizontal sheet.

This bad distribution of the flux can be remedied by replacing a part of the alkali metal or alkaline earth metal carbonate and fluoride by 15 to 20% of titanium oxide, zirconium oxide or zirconium silicate. The presence of titanium oxide has the effect of increasing the sensitivity to the porosity of the weld metal and of decreasing the mechanical characteristics thereof, whilst the presence of zirconium oxide or zirconium silicate does not allow one to weld in the downward direction. Furthermore, in both cases, the decrease of the proportion of carbonates provides diminished protection against hydrogen originating from atmospheric humidity and consequently cracks can be more readily formed on the seam of the weld metal.

It has been proposed to overcome the formation of these cracks by increasing the thickness of the coating but the electrode will then become more costly and increase the difficulty of access to the bottom of the welding seam. Finally, the welding in the downward direction with electrodes containing zirconium oxide or silicate remains practically impossible.

It has also been tried to overcome the porosity of the welding ribbons deposited by means of an electrode with a basic coating, by adding to the alkali metal or alkaline earth metal carbonates and, if desired, fluorides, prior to using them with a binding agent, a maximum proportion of 3% of a hydrophobic component, such as boric anhydride, if desired in the form of a borate.

The inventor has discovered that the presence of boric anhydride or borate has not only the effect of lowering the porosity but likewise of permitting one to weld vertically in the downward direction, of ensuring an improved distribution of the flux in a horizontal seam between chamfered horizontal sheets or between a horizontal sheet and a vertical sheet, this improved distribution of flux being very similar to that obtained with basic electrodes containing 15 to 20% of titanium oxide, zirconium oxide or zirconium silicate. Furthermore these basic electrodes with a free or combined boric anhydride ensure better protection against hydrogen than those with a free or combined titanium oxide or zirconium oxide.

The inventor has likewise found that these electrodes cause at times cracks to appear in the deposited welding seam due to the introduction of boron into this seam. He has succeeded in overcoming this drawback whilst fully preserving the advantages provided by a sufficient amount of free or combined boric anhydride, by incorporating in the coating iron carbonate and/or manganese carbonate and/or at least one higher iron oxide and/or at least one higher manganese oxide.

In the present specification the percentages cited in connection with the composition of the coating are percentages by weight, disregarding the metal powders which may be contained in this coating.

The basic coating of the electrode according to the invention contains simultaneously at least 0.5% of boric anhydride and at least 1% of iron carbonate and/or manganese carbonate; these two carbonates can be replaced at least partially by at least one of the higher iron and manganese oxides.

In the present specification the expression "higher iron oxide" designates an iron oxide which is more oxidised than FeO and the expression "higher manganese oxide" designates a manganese oxide which is more oxidised than MnO. These higher oxides are, for example, $Fe_3O_4$, $Fe_2O_3$, $Mn_3O_4$, $Mn_2O_3$ and $MnO_2$.

The electrode according to the invention can comprise at least 1% of iron carbonate or maganese carbonate or a higher iron oxide or a higher manganese oxide or a mixture of these two carbonates or these two higher oxides, or a mixture of at least one of these carbonates and at least one of these higher oxides.

The proportions of boric anhydride, iron carbonate and/or manganese carbonate and/or higher iron oxide and/or higher manganese oxide vary advantageously according to the particular use for which the electrode is intended.

For an electrode intended especially for horizontal welding, the coating contains advantageously 0.7 to 3%, preferably 1 to 2%, of boric anhydride $B_2O_3$ and at least 5%, preferably 10 to 20%, of iron and/or manganese carbonate and/or higher oxide of iron and/or manganese.

For an electrode intended especially for upward vertical welding, the coating contains advantageously 0.7 to 3%, preferably 1 to 2%, of boric anhydride $B_2O_3$ and at least 2%, preferably 3 to 7%, of iron and/or manganese carbonate and/or higher oxide of iron and or manganese.

For an electrode intended especially for downward vertical welding, the coating contains advantageously 1 to 6% preferably 3 to 5%, of boric anhydride $B_2O_3$ and at least 2%, preferably 5 to 15% of iron and/or manganese carbonate and/or higher oxide of iron and/or manganese.

The boric anhydride contained in the coating according to the invention is preferably used in the form of anhydrous manganese metaborate for horizontal welding or upward vertical welding, and in the form of anhydrous calcium metaborate for electrodes intended for downward vertical welding.

It should be noted that since boron is a powerful deionising agent, care should be taken that it is not used in excess so that the arc does not become unstable when welding with alternating current. It also produces splashings of metal around the welding bath.

Hereafter will be found some specific compositions of the electrode according to the invention.

(1) For an electrode intended specially for horizontal welding with an alternating current of 180 to 200 amperes, it is advantageous to use a wire of mild steel of a diameter of 8.5 millimetres which has been applied on it by extrusion and which corresponds to the data of the following table.

| Constituents | Parts by weight | Relative proportions of the constituents to be considered, percent |
|---|---|---|
| Magnesium carbonate | 214 | 47.27 |
| Calcium fluoride | 60 | 13.25 |
| $B_2O_3$ in anhydrous manganese metaborate | 8.6 | 1.90 |
| $Fe_2O_3$ | 40 | 8.84 |
| Manganese carbonate | 26 | 5.76 |
| Magnesium | 20 | |
| Iron in powder form | 900 | |
| Ferro-silicon with 45% Si | 68 | |
| Silico-manganese with 70% Mn, 20% Si and 10% iron | 20 | |
| Alumina | 24 | 5.30 |
| Dry potassium silicate | 40 | 8.84 |
| Dry sodium silicate | 40 | 8.84 |
| Total | 1,460.6 | 100.00 |

(2) For an electrode intended specially for downward vertical welding with a direct current of 120 to 140 amperes, it is advantageous to use a wire of mild steel of a diameter of 3.25 millimetres surrounded by a coating of a diameter of 5.30 millimetres which has been applied on its by extrusion and which corresponds to the data of the following table.

| Constituents | Parts by weight | Relative proportions of the constituents to be considered, percent |
|---|---|---|
| Calcium carbonate | 900 | 70.20 |
| Calcium fluoride | 130 | 10.12 |
| $B_2O_3$ in anhydrous calcium metaborate | 42.30 | 3.30 |
| Iron carbonate | 100 | 7.80 |
| Magnesium | 60 | |
| Ferro-silicon with 45% Si | 180 | |
| Ferro-manganese with 1% C | 100 | |
| Chromium oxide | 10 | 0.78 |
| Dry sodium silicate | 100 | 7.80 |
| Total | 1,622.30 | 100.00 |

(3) For an eletcrode intended specially for upward vertical welding with an alternating current of 180 to 100 amperes, it is advantageous to use a wire of mild steel of a diameter of 3.25 millimetres surrounded by a coating of a diameter of 5.40 millimetres which has been applied on it by extrusion and which corresponds to the data of the following table.

| Constituents | Parts by weight | Relative proportions of the constituents to be considered, percent |
|---|---|---|
| Calcium carbonate | 680 | 61.18 |
| Calcium fluoride | 220 | 19.79 |
| $B_2O_3$ anhydrous manganese metaborate | 21.5 | 1.93 |
| Iron carbonate | 70 | 6.30 |
| Magnesium | 60 | |
| Iron in powder form | 550 | |
| Ferro-silicon with 45% Si | 140 | |
| Ferro-manganese with 1% C | 60 | |
| Ferro-titanium with 45% Ti | 80 | |
| Dry potassium silicate | 90 | 8.10 |
| Dry sodium silicate | 30 | 2.70 |
| Total | 2,001.5 | 100.00 |

What I claim is:

1. In a coated welding electrode having a basic coating which contains carbonate and fluoride of at least one alkali metal or alkaline earth metal to which the basic character of the coating is due; the improvement in which the coating contains 0.5 to 6% by weight of the coating of boric anhydride and 1 to 20% by weight of the coating of a member selected from the class consisting of iron carbonate, manganese carbonate, trivalent iron oxide, manganese oxide in which the valence of the manganese is greater than 2, and mixtures thereof.

2. A coated welding electrode as claimed in claim 1, in which the boric anhydride is present in the amount 0.7 to 3% by weight of the coating and said member is present in the amount 5 to 20% by weight of the coating.

3. A coated welding electrode as claimed in claim 2, in which the boric anhydride is present in the amount 1 to 2% by weight of the coating.

4. A coated welding electrode as claimed in claim 3, in which the boric anhydride is in the form of anhydrous manganese metaborate.

5. A coated welding electrode as claimed in claim 1, in which the boric anhydride is present in the amount 1 to 6% by weight of the coating and said member is present in the amount 2 to 20% by weight of the coating.

6. A coated welding electrode as claimed in claim 5, in which the boric anhydride is present in an amount 1 to 2% by weight of the coating and said member is present in an amount of 3 to 7% by weight of the coating.

7. A coated welding electrode as claimed in claim 6, in which the boric anhydride is in the form of anhydrous manganese metaborate.

8. A coated welding electrode as claimed in claim 5, in which the boric anhydride is present in an amount 3 to 5% by weight of the coating and said member is present in an amount of 5 to 15% by weight of the coating.

9. A coated welding electrode as claimed in claim 8, in which the boric anhydride is in the form of anhydrous calcium metaborate.

References Cited

FOREIGN PATENTS 316,858  12/1956  Switzerland.

WILLIAM L. JARVIS, Primary Examiner

U.S. Cl. X.R.

148—26